(12) United States Patent
Brouwer et al.

(10) Patent No.: US 10,358,092 B2
(45) Date of Patent: Jul. 23, 2019

(54) DEVICE FOR ADJUSTING A SHELL-SHAPED HOUSING PART, A SUPPORTING FRAME FOR USE IN SUCH A DEVICE, AND A VEHICLE PROVIDED WITH SUCH A DEVICE

(71) Applicant: MCi (Mirror Controls International) Netherlands B.V., Woerden (NL)

(72) Inventors: Stefan Fritz Brouwer, Woerden (NL); François Roderik Henri Bouaziz, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 10 days.

(21) Appl. No.: 15/525,736

(22) PCT Filed: Nov. 10, 2015

(86) PCT No.: PCT/NL2015/050783
§ 371 (c)(1),
(2) Date: May 10, 2017

(87) PCT Pub. No.: WO2016/076713
PCT Pub. Date: May 19, 2015

(65) Prior Publication Data
US 2017/0313249 A1 Nov. 2, 2017

(30) Foreign Application Priority Data
Nov. 11, 2014 (NL) ...................................... 2013771

(51) Int. Cl.
*B60R 1/074* (2006.01)
(52) U.S. Cl.
CPC .................... *B60R 1/074* (2013.01)
(58) Field of Classification Search
CPC .................................................... B60R 1/074
(Continued)

(56) References Cited

U.S. PATENT DOCUMENTS 3,609,014 A * 9/1971 Kurz, Jr. ................. B60R 1/072
248/481
4,786,156 A * 11/1988 Kotani .................... B60R 1/074
248/478
(Continued)

FOREIGN PATENT DOCUMENTS

EP 2492145 B1 4/2014
GB 2273480 A 6/1994
(Continued)

*Primary Examiner* — Ricky D Shafer
(74) *Attorney, Agent, or Firm* — Volpe and Koenig P.C.

(57) ABSTRACT

The invention relates to a device for the adjustment of a shell-shaped housing part, for example a mirror housing. The device, in particular a door mirror device, comprising a base part (2) on which a support frame (3) is provided by means of a first hinge construction (3, 20, 25, 30, 60). Furthermore, the device comprises a first actuator (4) with which the carrier frame is pivotable relative to the base portion to a part of a substantially upwardly extending first pivot axis (5) between a folded position, in which the supporting frame, for example, lying substantially along the body of a motor vehicle, and a unfolded position, in which the supporting frame, for example, is oriented substantially transversely to the body. With the aid of a second hinge construction (30, 35, 60, 63) a carrier (6), in particular for carrying a mirror surface, is disposed on the support frame. Further, the apparatus comprises a second actuator (7) with which the carrier is pivotable with respect to the supporting frame is pivotable, wherein said carrier, and an optionally carried thereon reflecting surface, with respect to the supporting frame is only pivotable/are to a substantially transverse to the substantially upward direction-extending second hinge axis.

18 Claims, 6 Drawing Sheets

(58) Field of Classification Search
USPC .................................................. 359/841, 877
See application file for complete search history.

(56) References Cited

U.S. PATENT DOCUMENTS

| | | | | |
|---|---|---|---|---|
| 5,110,196 | A * | 5/1992 | Lang | B60R 1/0612 248/481 |
| 5,343,333 | A * | 8/1994 | Nagayama | B60R 1/025 359/874 |
| 5,583,703 | A * | 12/1996 | Lang | B60R 1/0605 248/481 |
| 6,340,231 | B1 * | 1/2002 | Polzer | B60R 1/074 359/872 |
| 6,347,872 | B1 * | 2/2002 | Brechbill | B60R 1/06 359/838 |
| 7,044,612 | B2 * | 5/2006 | Centmayer | B60R 1/02 359/876 |
| 7,883,223 | B1 * | 2/2011 | Foote | B60R 1/06 359/841 |
| 2004/0196577 | A1 | 10/2004 | Carter et al. | |
| 2007/0295134 | A1 * | 12/2007 | Krueger | B60R 1/074 74/425 |

FOREIGN PATENT DOCUMENTS

| | | |
|---|---|---|
| JP | H0431145 A | 2/1992 |
| WO | 2013126719 A2 | 8/2013 |
| WO | 2015191378 A1 | 12/2015 |

* cited by examiner

DEVICE FOR ADJUSTING A SHELL-SHAPED HOUSING PART, A SUPPORTING FRAME FOR USE IN SUCH A DEVICE, AND A VEHICLE PROVIDED WITH SUCH A DEVICE

CROSS REFERENCE TO RELATED APPLICATION

This application is a 35 USC § 371 National Stage application of International Patent Application No. PCT/NL2015/050783, which was filed Nov. 10, 2015, entitled "Device for adjusting a shell-shaped housing part, a supporting frame for use in such a device, and a vehicle provided with such a device" and Netherlands Patent Application No. 2013771, which was filed Nov. 11, 2014, and are incorporated herein by reference as if fully set forth.

FIELD OF INVENTION

The invention relates to a device for adjusting a shell-shaped housing part, such as, for instance, a mirror cap. In particular, such a device forms a mirror device or a so-called mirror adjusting device, more particularly an interior mirror device or an exterior mirror device, such as, for example, an exterior mirror device for a motor vehicle. The device comprises a base part, in particular for attachment to the body of the motor vehicle, on which with the aid of a first hinge construction a supporting frame is arranged, furthermore comprising a first, for example electric, actuator with which the supporting frame is pivotable relative to the base part about a first hinge axis extending in a substantially upward direction between a folded-in position, in which the supporting frame, for instance, substantially abuts along the body of the motor vehicle, and a folded-out position, in which the supporting frame, for instance, is oriented substantially transversely to the body.

BACKGROUND

Devices for adjusting mirrors housings can be used, for instance, to rotate a shell-shaped housing part mounted on the supporting frame, such as, for example, a mirror cap, from a parking position to a use position. The shell-shaped housing part then usually surrounds at least a part of the device for adjustment, so that the shell-shaped housing can screen the device at least partly. Usually, on the supporting frame, a mirror adjuster is provided for fine-tuning the position of a mirror surface held by the mirror adjuster. To that end, the mirror adjuster mounted on the supporting frame usually comprises a first adjustment actuator to be able to adjust the mirror surface to some extent about a substantially horizontal adjustment axis and a second adjustment actuator to be able to adjust or fine-tune the mirror surface to some extent about a substantially vertical adjustment axis.

However, such devices are often relatively large, often include many parts and, as a result, are often relatively complex in structure and/or are relatively costly to produce, for instance due to the many parts and/or due to the many operations that are necessary to assemble such a device, and/or can get damaged relatively quickly.

Accordingly, it is desirable to provide a device, in particular an exterior mirror device, that can at least partly counteract these disadvantages.

SUMMARY

The invention contemplates the provision of an alternative device, in particular an exterior mirror device. In particular, the invention contemplates the provision of an improved device. More particularly, the invention contemplates the provision of a device of the type mentioned in the preamble, whereby, preferably with preservation of one or more of the advantages, one or more of the disadvantages mentioned can be counteracted.

To that end, with the aid of a second hinge construction, on the supporting frame, a support, in particular a support for supporting a mirror surface, is arranged, and the device is provided with a second, for example electric, actuator with which the support is pivotable relative to the supporting frame, while the support, and a mirror surface possibly supported thereon, is pivotable relative to the supporting frame only about a second axis which extends substantially transversely to the substantially upward direction.

As the support, and a mirror surface possibly supported thereon, is pivotable relative to the supporting frame only about a second hinge axis extending substantially transversely to the substantially upward direction, and there is no second adjustment actuator to enable the mirror surface, if present, to be adjusted or fine-tuned to some extent about a substantially vertical adjustment axis relative to the supporting frame, the device can, for instance, comprise relatively few parts and/or relatively few costly and/or failure-sensitive parts, and/or be relatively inexpensive. The device can therefore have two stacked or stepped degrees of freedom, in that the supporting frame can have one degree of freedom relative to the base part and the support can have one degree of freedom relative to the supporting frame.

Preferably, the device may be provided with just two actuators. The employed set of two actuators can then most preferably be both suitable for rotating the support relative to the base part about the two hinge axes in order to fine tune the angular displacement of the support with two degrees of freedom; and suitable for rotating the support (together with the supporting frame on which it is arranged) about the first hinge axis to be able to bring the support from a folded-in position, for instance a parking position, an emergency folded-in position, or an overfold position, to a folded-out position, for instance a use position.

In an advantageous embodiment according to the invention, the support at least partly surrounds the supporting frame. The support which can extend at least partly around the supporting frame, can most preferably also at least partly surround a shaft of the base part defining the first hinge axis. As a result, a shell-shaped housing part, such as mirror cap, which is for instance formed by the support or provided thereon, can be moved relative to the base part with two degrees of freedom.

Preferably, a mirror surface can be fixedly or rigidly, that is, substantially immovably, provided on the support. This mirror surface can then, for instance, be adjusted jointly with the mirror cap formed by the shell-shaped housing part. Possibly, the mirror surface can form, together with the shell-shaped housing part, a substantially closed housing which extends substantially around the supporting frame and which can be moved relative to the supporting frame about the second, preferably substantially horizontal, hinge axis. Furthermore, this housing, together with the supporting frame, can be moved relative to the base part about the first, preferably substantially vertical, hinge axis.

The supporting frame may be mounted movably relative to the base part with the aid of at least a first ball hinge construction. Additionally or alternatively, the support can be mounted movably relative to the supporting frame with the aid of at least a second ball hinge construction. The center or midpoint of the first ball hinge construction and the center or midpoint of the second ball hinge construction can substantially coincide with each other. The first ball hinge construction and the second ball hinge construction can then substantially form a compound ball hinge construction. It is noted that the two ball hinge constructions can preferably together form a double or compound ball hinge construction with a shared center or midpoint. This can obviate openings, such as gaps, arising between the base part and the support when the support is moved relative to the base part. In preferred embodiments, a shell-shaped hinge part of the support can at least partly extend between a hinge part of the base part and a hinge part of the supporting frame. Further, via the cooperating ball hinge constructions, the support can be stably supported on the base part, for instance when the ball hinge constructions with the aid of a spring arranged around the hinge axis are pressed upon each other via the supporting frame. Since a mirror cap or other shell-shaped housing part may be immovably connected with the support, or may be an integral part thereof, what can hence be likewise obviated is that openings, such as gaps, arise between shell-shaped housing part and base part, when the support is moved relative to the base part. In this regard, such a device according to an aspect of the invention offers a major advantage over a device such as known from the European patent publication EP 2 492 145 B1, where at an underside of a mirror cap a relatively large opening is present to enable the mirror cap mentioned to be rotated around a base part or so-called foot of the device concerned with the aid of a mirror adjuster, rigidly mounted on the base part concerned, having two adjustment actuators. In addition, the invention provides the advantage that also returning the support, and the housing part possibly provided thereon, preferably relatively fast, from an emergency folded-in position to a folded-out position, can be done with the aid of one of the two actuators, and that, therefore, this does not need to be done manually or with the aid of an extra actuator, as is necessary with a device according to the teaching of EP 2 492 145 B1.

The elegant structure of the device according to an aspect of the present invention whereby a relatively large opening at the underside of a mirror cap as known from EP 2 492 145 B1 can thus be omitted, can for instance relatively simply and effectively counteract water undesirably ending up in the device when there is precipitation or when the car is being washed. Even when the support and a mirror surface, if present, are in an extreme adjusted position, the device can be free of gaps or other openings, so that, for instance, entry of water can be prevented.

Additionally or alternatively, the elegant structure of the device can make a contribution to the effect that the air resistance and/or the noise production of air flowing along the device can be relatively small. Even when the support and a mirror surface, if present, are in an extreme adjusted position, the device can be free of gaps or other openings through which air, passing between the support and the base part, can enter the device.

The invention furthermore relates to a vehicle provided with such a device.

Further advantageous embodiments of the invention are set forth in the subclaims.

BRIEF DESCRIPTION OF THE DRAWINGS

The invention will be further elucidated on the basis of exemplary embodiments represented in the drawing. In the drawing.

The drawing merely shows schematic representations of preferred embodiments of the invention. In the figures, like or corresponding parts are indicated with the same or corresponding reference numerals.

DETAILED DESCRIPTION OF THE PREFERRED EMBODIMENTS

Figure 1:
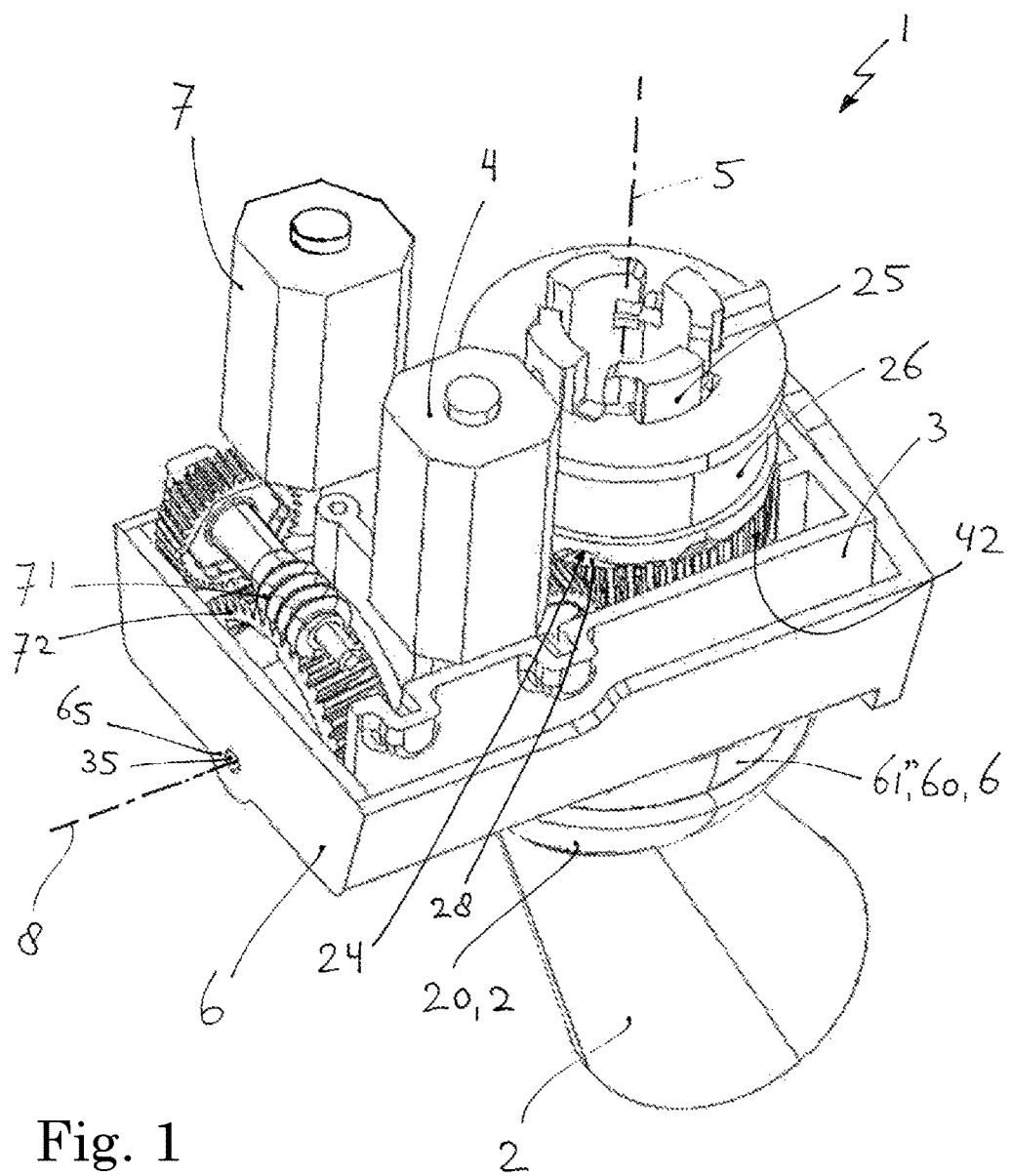
FIG. 1 shows a schematic perspective view of a first embodiment of a device according to an aspect of the invention.
Figure 2:
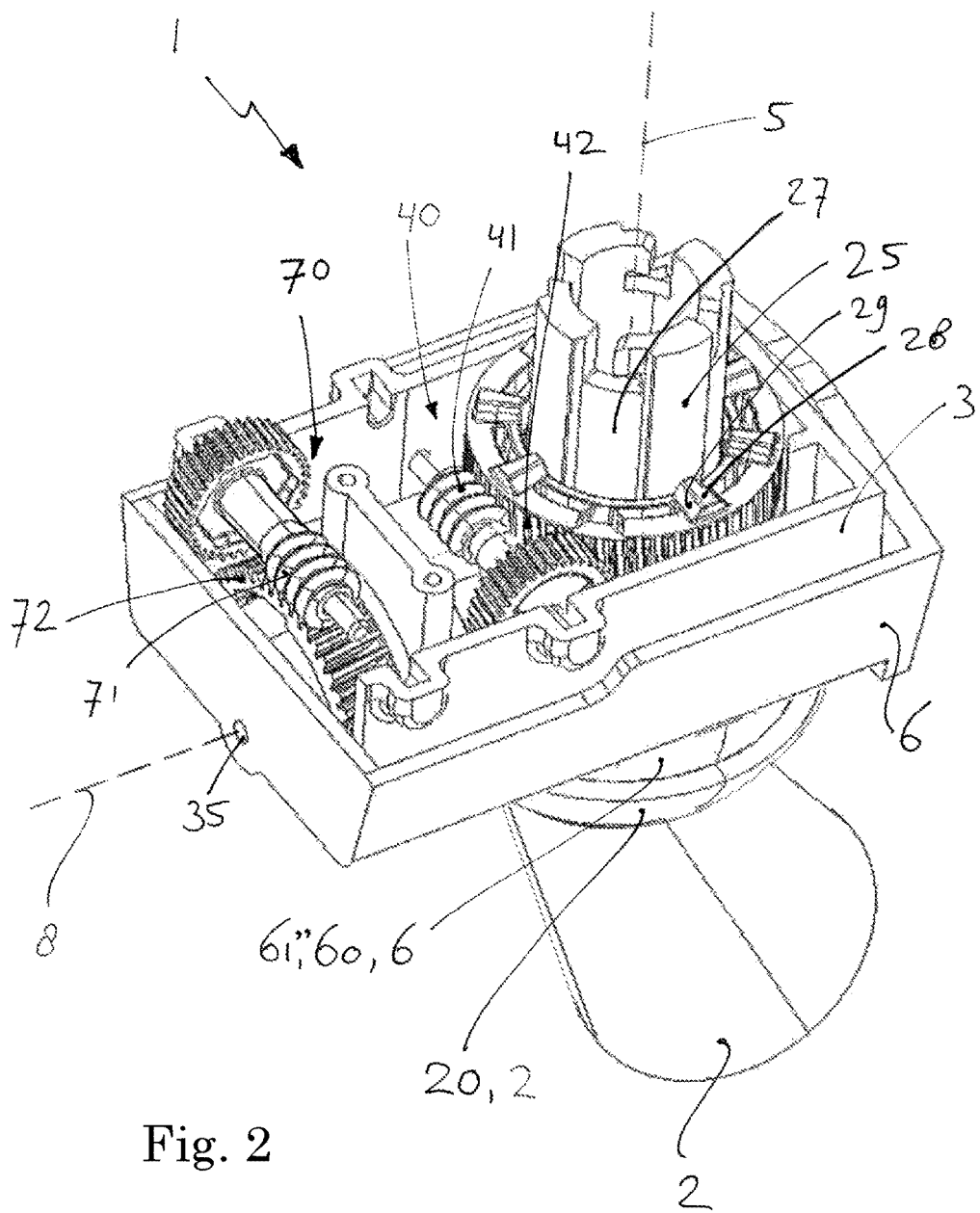
FIG. 2 shows a schematic perspective view of the device of FIG. 1, with a few parts omitted that FIG. 1 does show.
Figure 3:
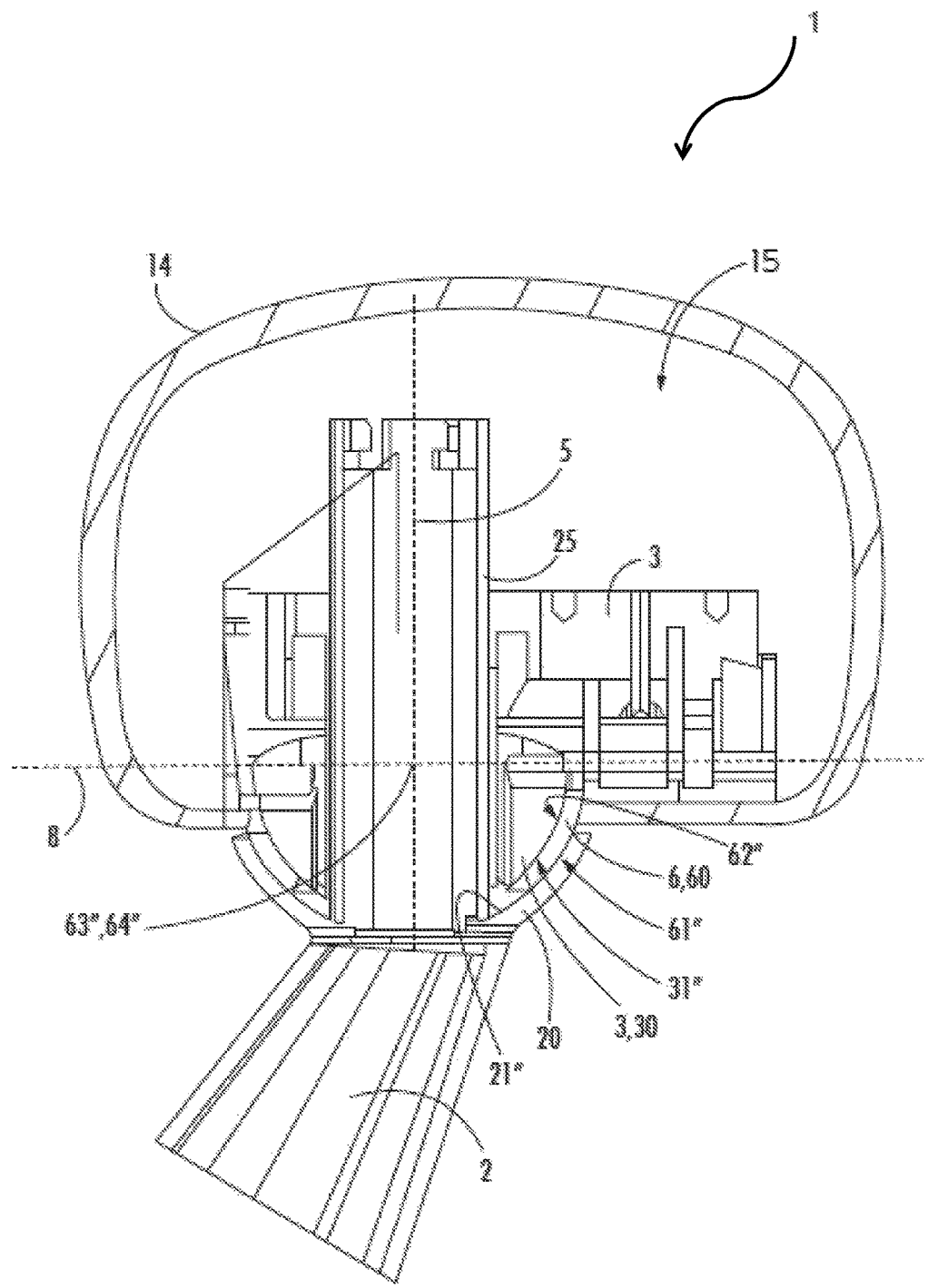
FIG. 3 shows a schematic cross section of the device of FIG. 2, with a few further parts omitted that FIG. 2 does show.
Figure 4:
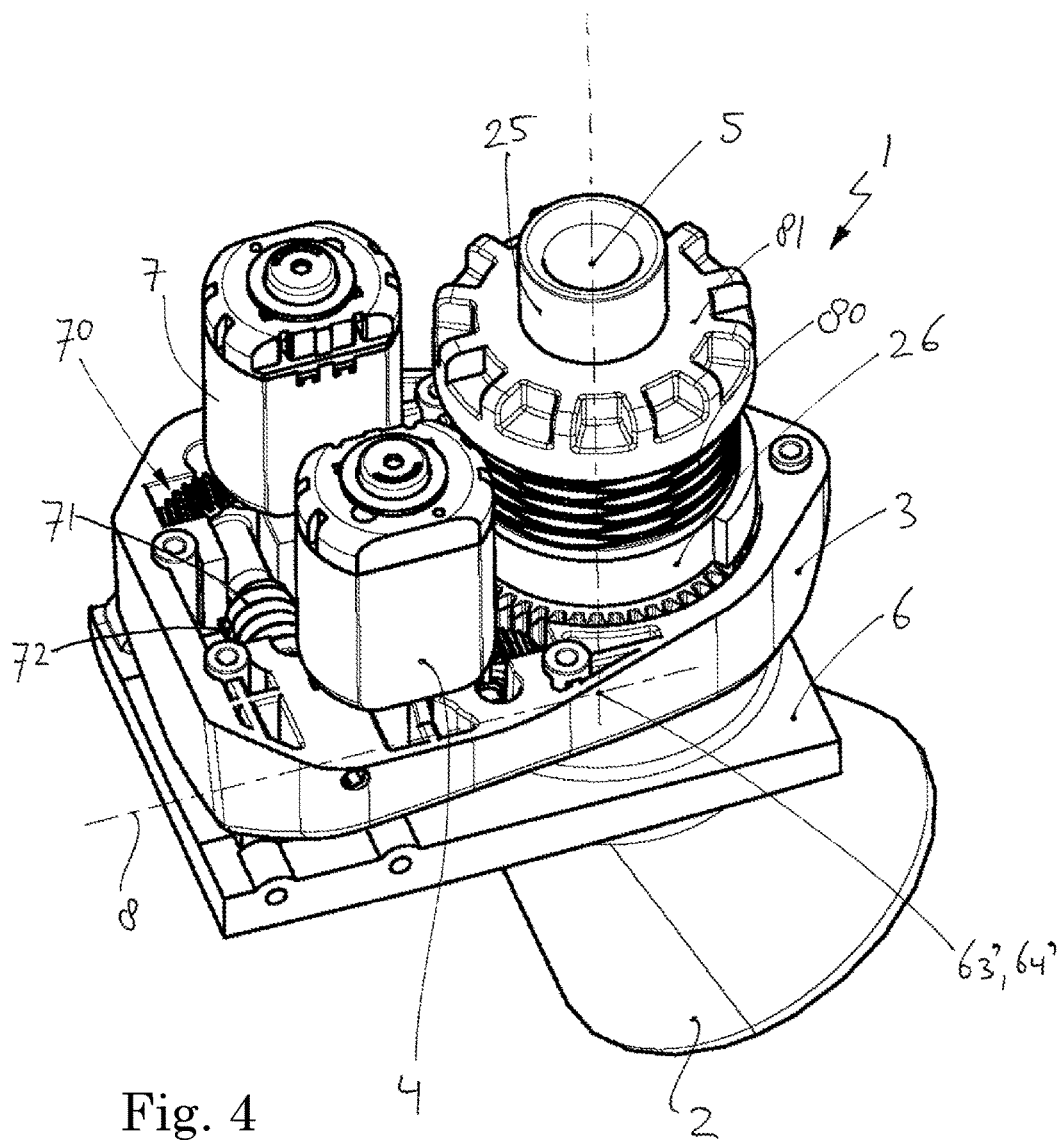
FIG. 4 shows a schematic perspective view of a second embodiment of a device according to an aspect of the invention.
Figure 5:
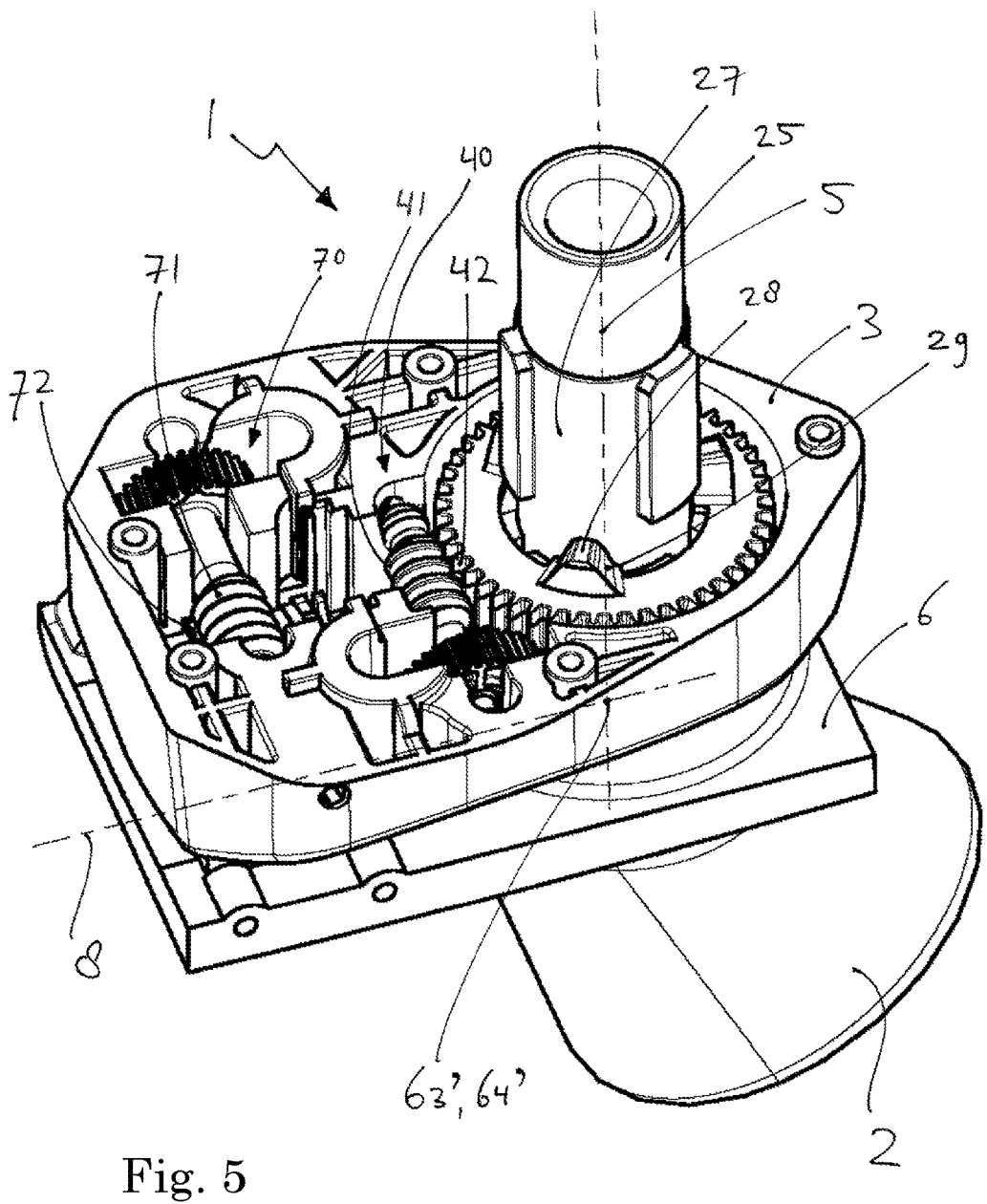
FIG. 5 shows a schematic perspective view of the device of FIG. 4, with a few parts omitted that FIG. 4 does show.
Figure 6:
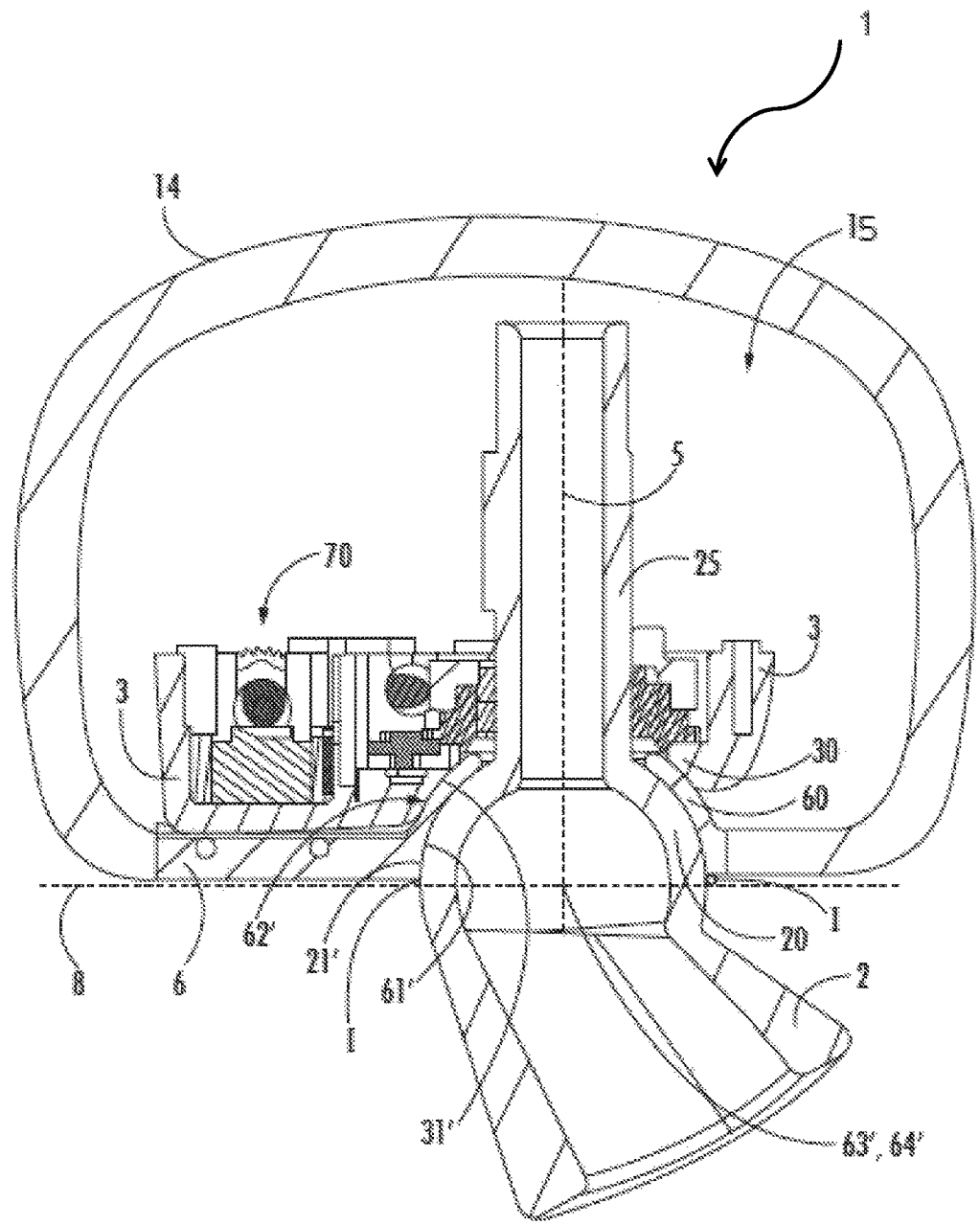
FIG. 6 shows a schematic cross section of the device of FIG. 5, with a few further parts omitted that FIG. 5 does show.

FIGS. 1-3 shows a first exemplary embodiment of a device 1 according to an aspect of the invention and FIGS. 4-6 show an alternative embodiment of the device 1. The device 1 can be, for example, an exterior mirror device 1, in particular an exterior mirror device for a motor vehicle.

The device 1 comprises a base part 2, in particular for attachment to the body of the motor vehicle. With the aid of a first hinge construction 3, 25, 20, 60, 30, a supporting frame 3 is arranged on the base part 2. The device 1 comprises a first actuator 4, for example an electric actuator 4, with which the supporting frame 3 is pivotable relative to the base part 2 about a first hinge axis 5 extending in a substantially upward direction, between a folded-in position, in which the supporting frame 3, for instance, substantially abuts along the body of the motor vehicle, and a folded-out position, in which the supporting frame 3, for instance, is oriented substantially transversely to the body.

It is noted that the folded-out position can be, for instance, a use position of an exterior mirror device and that the folded-in position can be, for instance, a parking position, in which the device 1 and/or a mirror cap possibly provided therein or thereon, for instance in lateral direction, protrudes less far relative to the body.

With the aid of a second hinge construction 35, 65, 30, 60, on the supporting frame 3 a support 6 is arranged. It is noted that the first and second hinge constructions are not to be separate constructions, but may, for instance, be partly formed by an integrated construction, such as, for instance, a double ball hinge 20, 60, 30.

In particular, the support 6 may be configured for directly or indirectly supporting a mirror surface 15. For instance, the support 6 may be configured for, substantially fixedly or rigidly, mounting a mirror glass thereon. Alternatively, for instance, a mirror surface 15 may be coated onto the support 6. While the support 6 may be suitable in particular for supporting a mirror surface 15, the support 6 may in alternative embodiments be suitable, for instance alternatively or additionally, to support one or more alternative elements, in particular elements to facilitate a driver of a vehicle at least partly observing areas located behind and/or next to him, such as, for example, a camera and/or a display, and/or a floodlight or other light source. Such elements may for instance be at least partly surrounded with a shell-shaped housing part 14 provided on or by the support 6.

Furthermore, the device 1 comprises a second actuator 7, preferably an electric actuator 7. With the aid of this second actuator 7, the support 6 is pivotable relative to the supporting frame 3.

It is noted that the support 6, and a mirror surface 15 possibly supported thereon, is pivotable relative to the supporting frame 3 only about a second hinge axis 8 extending substantially transversely to the substantially upward direction. The support 6 and/or the mirror surface 15, if present, can then, for instance, to some extent be pivoted forwards and backwards relative to the supporting frame 3, but then, for instance, cannot be adjusted relative to the supporting frame 3 between a position in which the mirror surface 15 runs more parallel to the body of the vehicle and a position in which the mirror surface 15 is more transverse to the body of the vehicle.

It is noted that the first and the second hinge axes 5, 8 can be virtual axes. Furthermore, it is noted that the hinge axes 5, 8 may be placed substantially transversely to each other, for instance perpendicular to each other. Additionally or alternatively, these (virtual) hinge axes 5, 8 may substantially intersect each other, most preferably in a center of the double ball hinge 20, 60, 30.

In preferred embodiments, the support 6 can extend at least partly around the supporting frame 3.

It is noted that the support 6 can form a shell-shaped housing part 14, such as, for instance, a mirror cap or part of a housing for a camera, or can be an integral part of a housing part, such as a mirror cap. Alternatively, the support 6 may be configured to be provided with a shell-shaped housing part 14 to be fixedly or rigidly mounted on the support 6.

Preferably, a possibly present mirror cap or other shell-shaped housing part 14 may be provided fixedly or rigidly, that is, substantially immovably, on the support 6.

Additionally or alternatively, a mirror surface 15, which may, for instance, be formed by a mirror glass, may be provided fixedly or rigidly, that is, substantially immovably, on the support 6.

Accordingly, the mirror surface 15 and the shell-shaped housing part 14 can both be fixedly or rigidly provided on the support 6 and one or both may form an integral part of the support.

In an embodiment, the mirror surface 15 may then, together with the shell-shaped housing part 14, form a substantially closed housing which extends substantially around the supporting frame 3 and which can be moved relative to the supporting frame 3 about the second hinge axis 8, which can preferably extend in substantially horizontal direction. Furthermore, the housing, together with the supporting frame 3 substantially located within it, can be moved relative to the base part 2 about the first, preferably substantially vertical, hinge axis 5.

In an alternative embodiment, it can be the supporting frame 3 that supports a shell-shaped housing part 14, such as a mirror cap. The supporting frame 3 can then, for instance, be formed integrally with the shell-shaped housing part 14, or may be configured to be provided with a shell-shaped housing part 14, such as a mirror cap, to be fixedly or rigidly mounted on the supporting frame 3. Just as in the above-described embodiment, in this alternative embodiment also, the mirror surface 15 may be fixedly or rigidly, that is, substantially immovably, provided on the support 6. An opening may then be provided in the housing part, which provides that the mirror surface 15 is at least partly visible.

In such an embodiment, the housing part, for instance the mirror cap, together with the supporting frame 3, can be moved relative to the base part 2 about the first, preferably substantially vertical, hinge axis 5. However, because the supporting frame 3 cannot be moved relative to the base part 2 about another hinge axis, in particular not about a substantially horizontal hinge axis 8, external loads that load the housing part during use, such as wind, can only tend to undesirably rotate the housing part coupled to the supporting frame 3 about the first hinge axis 5. Accordingly, such external loads on the housing part then will not tend to rotate the housing part, preferably the mirror cap, about a substantially horizontal axis. Since in such an embodiment the mirror surface 15 not substantially fixedly or rigidly connected with the housing part can be held out of the driving wind by this housing part, the device 1 needs to hold the support 6 provided with the mirror surface 15 less stiffly relative to the supporting frame 3 than the device 1 has to hold the supporting frame 3 with the shell-shaped housing part 14 substantially fixedly or rigidly provided thereon, during use possibly relatively heavily loaded. In the case where the second actuator 7 and a second drive train 70, if present, have to be suitable to overcome a force, for example a frictional force, with which the support 6 is restrained relative to the supporting frame 3 from unwanted rotation, the second actuator 7 in such an embodiment can be made of relatively light, and hence, for instance, relatively compact and/or inexpensive, design. This is because the force to be overcome can thus be relatively limited in the case where the support 6 provided with the mirror surface 15 can be held at least partly out of the wind by the shell-shaped housing part 14 which is then placed not on the support 6, but on the supporting frame 3.

In embodiments, the supporting frame 3 may be placed movably relative to the base part 2 with the aid of a first ball hinge construction 30, 60, 20. This does not mean, however, that the supporting frame 3 needs to have two degrees of freedom relative to the base part and/or that the supporting frame 3 needs to be able to rotate relative to the base part 2 about two axes. For the device 1 can preferably be so configured that the supporting frame 3 can only rotate about the first hinge axis 5 relative to the base part 2.

Additionally or alternatively, the support 6 may be mounted movably relative to the supporting frame 3 with the aid of a second ball hinge construction 60, 30. This does not mean, however, that the movement of the support 6 relative to the supporting frame 3 should then have two degrees of freedom of movement and/or that the support 6 needs to be able to rotate relative to the supporting frame about two axes. As said, this is because the support 6, possibly together with a mirror surface 15 possibly supported thereon, is pivotable relative to the supporting frame 3 only about the second hinge axis 8. The supporting frame 3 and the support 6 may, for instance to that end, be provided with cooperating hinge means 35, 65, which can for instance comprise a rotatably suspended pivot 35, to allow the support 6 and the supporting frame 3 to rotate about the second (virtual) hinge axis 8, as is also the case, for instance, in the exemplary embodiment of FIGS. 1-3.

It will be clear to one skilled in the art that the supporting frame 3 mounted movably relative to the base part 2 at least partly with the aid of the first ball hinge construction, may additionally be mounted movably relative to the base part 2 also with the aid of other hinge elements 25, 30.

Besides, it will be clear to one skilled in the art that the support 6 mounted movably relative to the supporting frame 3 at least partly with the aid of the second ball hinge construction 60, 30, may additionally be mounted movably relative to the supporting frame 3 also with the aid of other hinge elements 35, 65.

Such other hinge element 25, 30, 35, 65 can for instance form a constructive connection or coupling, such as a supporting connection or coupling, between the respective parts 2, 3, 6. Additionally, portions 20, 30, 60 of the respective ball hinge construction may provide for a seal between said parts 2, 3, 6, which seal can counteract that a gap arises between the respective parts 2, 3, 6 movable with respect to each other through which wind or precipitation can enter the device 1 unintentionally. Although said parts 20, 30, 60 of the respective ball hinge construction additionally can also form a bearing or supporting connection or coupling, the ball hinge construction does not need to form such a connection or coupling.

The center or midpoint of the first ball hinge construction 30, 20 and the center or midpoint of the second ball hinge construction 60, 30 can substantially coincide with each other. The first ball hinge construction 30, 20 and the second ball hinge construction 60, 30 can then substantially form a compound ball hinge construction 30, 60, 20. The two ball hinge constructions can then form a compound ball hinge construction 30, 60, 20 with a shared center or midpoint.

In preferred embodiments, including for instance the exemplary embodiments shown in FIG. 3 and FIG. 6, a shell-shaped hinge part 60 of the support 6 can at least partly extend between a hinge part 20 of the base part 2 and a hinge part 30 of the supporting frame 3, and may then be fittingly positioned between them in order to form a double or compound ball hinge construction. The hinge part 60 of the support 6 can be substantially formed as a convex shell 60 of which a concave inner side 62", 61' and a convex outer side 61", 62' are spaced apart and/or extend substantially parallel to each other. The concave inner side 62", 61' and the convex outer side 61", 62' can be formed as two spherical segments 62", 61', 61", 62', while the centers or virtual midpoints of the virtual spheres can substantially coincide.

It is noted that the hinge part 60 of the support 6, which can thus be substantially shell-shaped, may be provided with an opening through which the shaft 25 of the first hinge axis 5 can extend. This opening may preferably be slotted, while the length direction of the slot can extend in a direction around the second hinge axis 8, so that the opening can not only facilitate the support 6 pivoting along with the supporting frame 3 about the first hinge axis 5, but so that the opening can also facilitate the support 6 being pivoted relative to the supporting frame about the second hinge axis.

As can, for instance, be further seen in FIGS. 1-3, in embodiments, a convex outer side 61", formed as a spherical segment 61", of a substantially shell-shaped hinge part 60 of the support 6 may be fittingly positioned in a hinge part 20 of the base part 2, which hinge part 20 has a concave inner side 21" formed as a spherical segment 21".

Furthermore, the substantially shell-shaped hinge part 60 of the support 6 can then have a concave inner side 62" in the form of a spherical segment 62", while in the hinge part 60 of the support 6 a convex outer side 31", formed as a spherical segment 31", of a hinge part 30 of the supporting frame 3 is fittingly positioned. Advantageously, in that case, the virtual center 63" of the spherical shape of the convex outer side 61", formed as a spherical segment 61", of the hinge part 60 of the support 6 and the virtual center 64" of the spherical shape of the concave inner side 62", formed as spherical segment 62", of the hinge part 60 of the support 6 can substantially coincide. These substantially coinciding virtual centers 63", 64" can then be located substantially on the first hinge axis 5 and substantially on the second hinge axis 8.

It is noted that while the support 6 can thus be mounted movably relative to the supporting frame 3 with the aid of a ball hinge construction 60, 30, this ball hinge construction 60, 30 does not need to be suitable to retain the support 6 and the supporting frame 3 relative to each other. For this can also be accomplished, for instance, in a different manner. For instance, this can be done at least partly with the aid of the above-mentioned cooperating hinge means 35, 65. The ball hinge construction 60, 30 may then, for instance, at least partly be provided to counteract, upon mutual rotation of support and supporting frame, a gap arising between support and supporting frame, so that, for instance, driving wind or precipitation can undesirably enter the device 1. However, also with the aid of other means, a closure between support and supporting frame can be provided. For instance, the supporting frame 3 may have a partly cylinder-shaped, convex hinge part to adjoin a partly cylinder-shaped, concave hinge part of the support 6, at least partly placed around it.

It is noted that such a ball hinge construction may also be designed differently. For instance, the base part 2, as is also the case, for instance, in the exemplary embodiment of FIGS. 4-6, may, in embodiments, be provided with a hinge part 20 that is not concave and cup-shaped, but, for instance, comprises a spherical segment 21' at least partly around which a concave spherical segment 61' is placed which is formed by a concave inner side 61' of a hinge part 60 of the support 6. The supporting frame 3 can then have, for instance, a hinge part 30 that is provided with a concave, spherical segment-shaped inner side 31' which lies at least partly around a convex outer side 62' of the hinge part 60 of the support 6. For instance in such a case, the coinciding virtual centers 63', 64' can be located relatively low in the device 1.

By placing the second hinge axis 8 near the underside of the support 6 and/or the underside of the shell-shaped housing part 14, for instance not more than 3, 2 or 1 cm above or below the respective underside, the ball hinge can be made of relatively small design. As a result, the construction can remain relatively small, which can be advantageous, for instance, because air resistance can be kept limited and/or because this can lead to more freedom of design and/or more aesthetic devices, in particular more aesthetic exterior mirror devices. For instance, the base part 2 can be implemented as a relatively thin or narrow stick or tube, through which, for instance, cabling can run for control and/or power supply of the actuators and/or for sensors, if present, while above the tube a mirror cap, for instance substantially shaped as a hemisphere, may be placed.

In the embodiment of FIGS. 4-6, the second hinge axis 8 is just below the support, and in alternative embodiments, for instance comprising a ball hinge construction corresponding to that of the embodiment shown in FIGS. 1-3, the second hinge axis 8, and hence also the coinciding virtual centers 63", 64", may, by contrast, be just above the underside of the support, for instance at a level located within the supporting frame 3 and/or within the support 6. Such a relatively high placement of the coinciding virtual centers 63", 64", for instance at a height located in a mirror cap or other shell-shaped housing part 14, may sometimes be actually desired, for instance for aesthetic reasons.

As the support 6, in embodiments, can thus be placed movably relative to the base part 2 at least partly with the aid of a ball hinge construction 60, 20, what can then be obviated is that openings, such as gaps, arise between the base part 2 and the support 6 when the support is moved relative to the base part. Since the shell-shaped housing part 14 can be immovably connected with the support 6, or can be an integral part thereof, what can therefore be obviated likewise is that openings, such as gaps, arise between housing part and base part 2 when the support 6 is moved relative to the base part 2.

This elegant structure of the device 1 can for instance counteract water undesirably ending up in the device 1 when there is precipitation or when a car or other vehicle on which the device 1 is provided is being washed. Even when the support 6 and a mirror surface 15, if present, are in an extreme adjusted position, the device 1 can be free of gaps or other openings, so that entry of water can be prevented. Additionally or alternatively, this elegant structure of the device 1 can also make a contribution to the effect that the, usually undesired, air resistance and/or the noise production of air flowing along the device 1 can be relatively small.

When, as for instance in the case of the exemplary embodiment of FIGS. 4-6, the hinge part 20 of the base part 2 is not a cup- or shell-shaped hinge part 20 that is open towards the top (as is the case, for instance, in the exemplary embodiment of FIGS. 1-3), but, conversely, is at least partly ball-shaped or spherical, with at least a part of the spherical segment 21' facing up, entry of water into the device 1 can be counteracted very well. In particular, the unwanted ending up of water in the base part 2 can then be counteracted comparatively well.

As has already been noted hereinabove, with the aid of the first actuator 4, the supporting frame 3 can be pivotable relative to the base part 2 about the first hinge axis 5 extending in a substantially upward direction, thereby bringing for instance the support 6 and a housing part and/or mirror surface 15 possibly mounted thereon, from, for instance, a folded-in position or parking position to a folded-out position or use position or vice versa. To this end, the device 1 can comprise, for instance, a first drive train 40 which is driven by the first actuator 4. An output gearwheel 41, for instance a worm 41, of the first drive train 40 can then engage a first main toothing 42 which can then extend at least partly around the first hinge axis 5 and which may be substantially non-rotatably placed relative to the first hinge axis 5. The first main toothing 42 can be, for example, a gearwheel 42 or a gearwheel segment, or be formed thereby. Preferably, teeth of the first main toothing 42 may be substantially located on a virtual circle or virtual round cylinder which extends at least partly around the first hinge axis 5.

That the first main toothing 42 may be placed "substantially non-rotatably" relative to the first hinge axis 5, can mean that the main toothing can be basically non-rotatably locked, but, for instance, does have the ability to come loose to be able to rotate, when such is desired, for instance when a cyclist or pedestrian or an object collides with the mirror cap, if present, or other shell-shaped housing part 14. In this manner, upon emergency operation, that is, for instance, upon collision with a cyclist, pedestrian or object, the supporting frame 3, and hence also the support 6 coupled thereto and the mirror cap, if present, or other shell-shaped housing part 14, can pivot about the first hinge axis 5 from the folded-out position to an emergency folded-in position, which can, for instance, substantially correspond to the folded-in position or parking position, or which may, on the other hand, be formed, for instance, by a so-called overfold position, when the pedestrian or cyclist, for instance, collides with a rear side of the mirror cap or other shell-shaped housing part 14.

The first main toothing 42 may for instance be coupled with the base part 2 such that the first main toothing 42 is substantially locked against rotation about the first hinge axis 5, preferably with the aid of a slip coupling or other coupling 25, 26, 27, 28, 29 which is configured to unlock when a predetermined torque is active on the supporting frame 3, for instance as a result of an object or person colliding with a lateral end of a mirror cap or other shell-shaped housing part 14, connected with the supporting frame 3 via the support 6.

The main toothing 42 mentioned may for instance be placed rotatably about a, preferably cylinder-shaped, shaft 25, and be placed such that a central axial line of the shaft 25 is substantially in line with the first (virtual) hinge axis 5 extending in a substantially upward direction. The shaft 25 may be non-rotatably connected with the base part 2 and preferably form a part thereof. The device 1 can then further comprise a locking ring 26 which is non-rotatably, but axially slidably, placed on the shaft 25, for instance with the aid of pawls on the rings 26 which are slidable in slots 27 in the shaft 25. The locking ring 26 and the main toothing 42, for instance formed by a gearwheel 42, may be configured, for instance with the aid of projections 28 and cavities 24, to engage each other, so that the locking ring 26 can counteract rotation of the main toothing 42 about the shaft. It is noted that the locking ring 26 and the main toothing 42 may most preferably be biased towards each other, so that the projections and cavities engage each other. As can be seen, for instance, in the embodiment of FIGS. 4-6, this can be done, in embodiments, with the aid of a spring element 80, which may for instance be fixed at one end or may abut an axially nonslidable stop element 81. When a predetermined torque is active on the supporting frame 3, for instance as a result of an object or a person colliding with a lateral end of a shell-shaped housing part 14 connected with the supporting frame 3 via the support 6, the projections and cavities, which for that purpose may for instance be provided with run-on surfaces 29, can slip loose. As a result, the main toothing 42 can uncouple from the shaft 25 and, together with the supporting frame 3 (and together with the support 6 and a mirror cap, if present, or other shell-shaped housing part 14) rotate about the shaft 25 and hence rotate about the first virtual hinge axis 5.

For instance by virtue of the spring element 80, the main toothing 42 after emergency operation (and rotation of the shell-shaped housing part 14 about the first hinge axis 5) can be substantially non-rotatably coupled to the shaft 25 again. As the skilled person will understand, the supporting frame 3, and a shell-shaped housing part 14, if present, connected therewith, can thereupon be reset in a use position with the aid of the first actuator 4. Accordingly, by such a device 1, with the aid of only two actuators 4, 7, a shell-shaped housing part 14, such as a mirror cap, can not only be folded in and folded out and in addition fine-tuned about the first and second axes 5, 8, but the housing part can moreover be reset to a use condition after emergency operation.

Further, it is noted that, as has already been stated above, the support 6 is pivotable relative to the supporting frame 3 about the second (virtual) hinge axis 8, which extends substantially transversely to the substantially upward direction. For instance, this may have been accomplished by configuring the device 1 such that the second actuator 7 drives a second drive train 70, of which an output gearwheel 71 engages a second main toothing 72. This second main toothing 72 can preferably extend at least partly around the second (virtual) hinge axis 8 and can moreover be placed substantially non-rotatably relative to said second hinge axis 8.

Since a mirror surface 15 of an exterior mirror device often needs to be capable of being rotated or pivoted just through a relatively small angle, such as for instance an angle of between about −15°, −12°, −10° or −8° on one side and about +15°, +12°, +10° or +8° on the other side, in order to be adaptable to the requirements or wishes of, for instance, a user of a vehicle, it can suffice if the second main toothing 72 extends around the second hinge axis 8 likewise over a relatively small angle, of, for instance, at most about 40°, about 35° or about 30°. However, advantageously, the second main toothing 72 may, by contrast, also extend over a greater angle, for example over at least 90°, 120° or 160°, so that, for instance, the mirror glass can be rotated such that a driver of a vehicle can see the ground, a gutter or a curb next to the vehicle via the mirror glass, for instance when parking in line.

Since the first main toothing 42 preferably can be used both to be able to adapt the mirror surface 15 of an exterior mirror device in a relatively small fine-tune range, for instance a range of between about −15°, −12°, −10° or −8° on one side and about +15°, +12°, +10° or +8° on the other side, such as, for example, from about −10° to about +10°, and to adjust a mirror cap or other shell-shaped housing part 14 between a parking position and a use position, such as, for instance, a neutral use position from which the mirror surface 15 can optionally be adapted to the requirements or wishes of, for example, a user, the minimum angle over which the first main toothing 42 extends can be considerably greater than the minimum angle over which the second main toothing 72 can extend. Thus, it may for instance be desirable that the first main toothing 42 can allow a minimum angular rotation which is between 40° and 80°, for example, a minimum angular rotation of about 60°.

The second main toothing 72 can for instance be a gearwheel or a gearwheel segment, or be formed thereby. Preferably, the teeth thereof may be substantially located on a virtual circle or virtual round cylinder around the second hinge axis 8.

It is noted that the device 1, in particular an exterior mirror device for a motor vehicle, may be configured such that the supporting frame 3, and hence also the support 6 coupled therewith and the mirror surface 15, if present, can be pivoted with the aid of the first actuator 4 from the folded-out position about the first hinge axis 5 in order to be able to adjust the mirror surface 15, if present, from the folded-out position to an adapted folded-out position. Preferably, the mirror surface 15, if present, can be adjusted from the neutral position in both senses of rotation, that is, both clockwise and counterclockwise in order to be able to set a desired angle, for instance a desired angle of view.

In embodiments of a device 1, in particular an exterior mirror device for a motor vehicle, according to the invention, the first actuator 4 and/or the first drive train 40 may be mounted in or on the supporting frame 3. Additionally or alternatively, the second actuator 7 and/or the second drive train 70 can be mounted in or on the supporting frame 3. For instance, both actuators 4, 7 and both drive trains 40, 70 can move along with the supporting frame 3, when the supporting frame 3 pivots about the first hinge axis 5. It is noted that the supporting frame 3 may be provided with mounting means for fixing an actuator 4, 7, or a component such as a gearwheel, shaft or bearing of a drive train 40, 70, on and/or in the supporting frame 3.

Optionally, the device 1 can comprise a rotation sensor, preferably a potentiometer or Hall sensor, which has a sensor axis or sensor shaft, and wherein the device 1 is configured for rotating the sensor axis or sensor shaft during a limited part of the pivoting route between the folded-out position and the folded-in position and/or during a limited part of the pivoting route between the folded-in position and the folded-out position. Such a sensor is described, for example, in Netherlands patent application NL 2 012 808, which is incorporated herein by reference.

It is noted that this sensor may be fixed to or on the supporting frame 3 at least against rotation relative to the first hinge axis 5 or so-called rotation axis 5, in order to be able to pivot along with the supporting frame 3 about the first hinge axis 5 of the device 1 between the folded-in position and the folded-out position and/or between the folded-out position and the folded-in position. The device 1 can then further comprise a sensor driving element for driving the sensor shaft, this driving element being fixed at least against rotation relative to the hinge axis, for instance by being fixed on the base part 2, and the device 1 being so configured that the sensor driving element rotates the sensor axis or sensor shaft during a limited part of the pivoting movement of the sensor pivoting along with the supporting frame 3 between the folded-in position and the folded-out position and/or between the folded-out position and the folded-in position.

Alternatively, the sensor may be fixed at least against rotation relative to the first hinge axis 5 or so-called rotation axis 5 in or on the base part 2, for instance in or on a shaft 25 thereof which extends around and in the direction of the first hinge axis 5, while the device 1 can furthermore comprise a sensor driving element for driving the sensor shaft. The driving element mentioned can then pivot along with the supporting frame 3 between the folded-in position and the folded-out position of the supporting frame and/or vice versa. The device 1 may then be furthermore configured such that the driving element rotates the sensor shaft during a limited part of the pivoting movement of the driving element that pivots along with the supporting frame 3 between the folded-in position and the folded-out position and/or between the folded-out position and the folded-in position.

In embodiments, the sensor shaft may be coupled to, and/or provided with, a driven element for cooperation with the driving element, the driving element and the driven element being provided with corresponding toothing, such that the driving element drives the driven element during the limited part of the pivoting movement of the supporting frame 3 between the folded-in position and the folded-out position and/or during the limited part of the pivoting movement of the supporting frame 3 between the folded-out position and the folded-in position. The toothing mentioned can be, for instance, a so-called involute or evolvent toothing.

Additionally or alternatively, the driven element can comprise a blocking part for cooperation with a corresponding locking part of the driving element, while the blocking part and the locking part may then be so configured that the driving element locks the driven element against rotation during a part of the pivoting movement of the supporting frame 3 between the folded-in position and the folded-out position and/or vice versa. Preferably, the blocking part and the locking part can comprise corresponding round or circular guiding surfaces, corresponding such that a portion of the circular guiding surface of the blocking part of the driving element can be guided along the circular guiding surface of the locking part of the driven element, thereby counteracting rotation of the driven element about a central axis of the sensor shaft.

Additionally, the driven element can comprise at least one tooth which protrudes further outwards than the other teeth of the driven element, while the upper surface or so-called top land of this relatively far protruding tooth forms the circular guiding surface of the locking part of the driven element. Preferably, the tooth defining the circular guiding surface of the locking part of the driven element can have a relatively large tooth thickness or so-called circular thickness with respect to the tooth thickness or the pitch of the other teeth or so-called normal teeth of the driven element.

The teeth of the driving element may be positioned along a relatively small part of a perimeter, for instance an outer perimeter, of the driving element, preferably along between ¹/₂₄ and ⅙ of the perimeter, more preferably along between ¹/₁₈ and ¹/₁₂, as for instance along about ¹/₁₄ or about ¹/₁₅ of the perimeter. Additionally or alternatively, tooth contact faces of the teeth of the driven element may be positioned along a relatively large part of the perimeter, for instance an outer perimeter, of the driven element, preferably along between ½ and ⁹/₁₀ of the perimeter, more preferably along at least ¾ of the perimeter, such as, for instance, along about ⅚ of the perimeter.

To ensure that the supporting frame 3 can be held in a particular position relative to the base part 2, that is, to be able to counteract the supporting frame 3 unintentionally rotating slightly about the first hinge axis 5, for instance as a result of play in the first drive train 40, the device 1 may be provided with means that counteract such rotation. Thus, the first drive train 40 may for instance be of self-locking design, for instance by including in the first drive train 40 a worm 41 and a toothing 42 engaging the worm and cooperating therewith, so that when the axis or shaft of the worm 41 is driven, for instance indirectly, by the first actuator 4 and rotated, the supporting frame 3 can rotate about the first hinge axis 5, but when it is attempted to rotate the supporting frame 3 about the first hinge axis 5 with an external force, the toothing of the worm 41 and the toothing 42 engaging it are substantially unable to rotate the worm 41 about its axis or shaft, so that the device 1 can therefore be substantially self-locking.

Additionally or alternatively, the device 1 may be so configured that there is a high measure of friction between the supporting frame 3 and the base part 2, for instance at least partly by pressing the supporting frame 3 and the base part 2 against each other and holding them so. This friction may be necessary to damp out any vibrations, which is of benefit to the stability of the sight image in the mirror surface 15. Most preferably, the supporting frame 3 may to that end be biased against the base part 2.

It is noted that the support 6 can be held in a particular position relative to the supporting frame 3 with appropriate means for that purpose. The device 1 may therefore be configured to provide that the support 6 can be held in a particular position relative to the supporting frame 3, that is, to be able to counteract the support 6 unintentionally rotating slightly about the second hinge axis 8. For instance, the second drive train 70 may to that end be of substantially self-locking design, for instance by including in the drive train 70 a worm 71 and a toothing 72 engaging the worm and cooperating therewith, so that when the axis or shaft of the worm 71 is driven, for instance indirectly, by the second actuator 7 and rotated, the support 6 can rotate about the second hinge axis 8, but when it is attempted to rotate the support 6 about the second hinge axis 8 with an external force, the toothing of the worm 71 and the toothing 72 engaging it are substantially unable to rotate the worm 71 about its axis or shaft. Additionally or alternatively, the device 1 may be so configured that there is a high measure of friction between the supporting frame 3 and the support 6, for instance at least partly by mounting the supporting frame 3 and the support relatively stiffly against each other and/or biasing them in a direction towards each other. The support 6 can hence be pressed against the supporting frame 3 to temporarily retain the support and supporting frame relative to each other with the aid of friction. The device may to that end comprise a biasing element, such as a spring.

It will be clear to one skilled in the art that, in embodiments, a single biasing element can press the supporting frame 3 against the support 6 and the support 6 against the base part 2, for instance by clamping the hinge part 20 of the base part between the hinge parts 30, 60 of the supporting frame 3 and the support 6, so that at the same time undesired rotation of supporting frame relative to support as well as undesired rotation of support relative to base part can be counteracted.

As will be clear, the device 1 may be provided on a vehicle. The invention, furthermore, also relates to a vehicle, preferably a motor vehicle, such as, for example, a car, camper, bus, or truck, provided with such a device 1.

Furthermore, the invention also relates to a supporting frame 3 configured for use in a device 1 according to aspects of the invention, the supporting frame 3 being configured to be pivotably mounted on a base part 2 of the device 1, such that the supporting frame 3 is pivotable between a folded-in position and a folded-out position relative to the base part 2 about a first hinge axis 5 extending in a substantially upward direction. Here, the supporting frame 3 is furthermore configured to allow a support 6, in particular a support for supporting a mirror surface 15, to be arranged on the supporting frame 3, such that the support 6 during use is pivotable relative to the supporting frame 3 only about a second hinge axis 8 extending substantially transversely to the substantially upward direction. Most preferably, the supporting frame 3 may furthermore be configured for holding a first, for example electric, actuator 4 with which during use the supporting frame 3 is pivotable relative to the base part 2 about the first hinge axis 5 extending in a substantially upward direction, between the folded-in position and the folded-out position, and/or also configured for holding a second, for example electric, actuator 7 with which the support 6 during use is pivotable relative to the supporting frame 3 about the second hinge axis 8 extending substantially transversely to the substantially upward direction.

It is noted that for the purpose of clarity and a concise description, elements or features have been described herein as part of the same or different exemplary embodiments and that the scope of the invention can encompass embodiments comprising combinations of all or some of the elements or features described.

It will be clear that each of the devices shown and described and each element of the devices shown and described are each also understood to have been described and shown separately and can also be applied individually and/or can be applied in combination with at least one other element and are each understood to have been described herein as such.

Furthermore, it is noted that the invention is not limited to the exemplary embodiments described here. Many variants are possible. Such variants will be clear to one skilled in the art and are understood to be within the scope of the invention, as set forth in the following claims.

The invention claimed is:

1. A device for adjusting a shell-shaped housing part for a mirror device of a motor vehicle comprising:
    a base part, for attachment to a body of the motor vehicle;
    a supporting frame arranged on the base part;
    a first hinge construction including a first actuator with which the supporting frame is pivotable relative to the base part about a first hinge axis between a folded-in position and a folded-out position;
    a support arranged on the supporting frame and coupled therewith, wherein
        the support extends at least partly around the supporting frame,
        the shell-shaped housing part is provided on or forms the support, and
        the support is adapted for supporting a mirror surface; and
    a second hinge construction including a second actuator with which the support is pivotable relative to the supporting frame about a second hinge axis, wherein
    the first hinge axis extends in a substantially upward direction,
    the second hinge axis extends substantially transverse to the substantially upward direction,
    the first actuator is suitable for rotating the supporting frame, the support, and the shell-shaped housing part relative to the base part about the first hinge axis, and
    the second actuator is suitable for rotating the support and the shell-shaped housing part relative to the supporting frame and the base part about the second hinge axis.

2. The device according to claim 1, wherein the shell-shaped housing part is fixedly mounted on the support.

3. The device according to claim 1, wherein the device is configured such that upon emergency operation the supporting frame and the support coupled therewith pivot about the first hinge axis from the folded-out position to an emergency folded-in position.

4. The device according to claim 1, wherein
    the mirror surface is coupled with the support, and the supporting frame, and the support and mirror surface coupled therewith, pivot about the first hinge axis by the first actuator to adjust the mirror surface from the folded-out position to an adapted folded-out position.

5. The device according to claim 1, wherein the mirror surface is coupled with the support, and the support and mirror surface coupled therewith are pivotable relative to the supporting frame about the second hinge axis.

6. The device according to claim 1, wherein the first actuator and the second actuator are positioned on the supporting frame.

7. A vehicle provided with the device according to claim 1.

8. A device for adjusting a shell-shaped housing part for a mirror device of a motor vehicle comprising:
    a base part, for attachment to a body of the motor vehicle;
    a supporting frame arranged on the base part;
    a first hinge construction including a first actuator with which the supporting frame is pivotable relative to the base part about a first hinge axis between a folded-in position and a folded-out position;
    a support arranged on the supporting frame and coupled therewith, wherein
        the shell-shaped housing part is provided on or forms the support, and
        the support is adapted for supporting a mirror surface; and
    a second hinge construction including a second actuator with which the support is pivotable relative to the supporting frame about a second hinge axis, wherein
    the first hinge axis extends in a substantially upward direction,
    the second hinge axis extends substantially transverse to the substantially upward direction,
    the first actuator is suitable for rotating the supporting frame, the support, and the shell-shaped housing part relative to the base part about the first hinge axis,
    the second actuator is suitable for rotating the support and the shell-shaped housing part relative to the supporting frame and the base part about the second hinge axis,
    the supporting frame is mounted movably relative to the base part at least in part using the first hinge construction, and the support is mounted movably relative to the supporting frame at least in part using the second hinge construction, and
    the first hinge construction is a first ball hinge construction and the second hinge construction is a second ball hinge construction.

9. The device according to claim 8, wherein a center or midpoint of the first ball hinge construction and a center or midpoint of the second ball hinge construction substantially coincide, such that the first ball hinge construction and the second ball hinge construction substantially form a double ball hinge construction or a compound ball hinge construction.

10. The device according to claim 9, wherein a substantially shell-shaped hinge part of the support at least partly extends between a hinge part of the base part and a hinge part of the supporting frame, wherein
    the substantially shell-shaped hinge part of the support comprises a first spherical segment, including a first inner side and a first outer side,
    the hinge part of the base part comprises a second spherical segment including a second inner side fittingly positioned with the first inner side of the substantially shell-shaped hinge part, and
    the hinge part of the supporting frame comprises a third spherical segment including a third inner side fittingly positioned with the first outer side of the substantially shell-shaped hinge part.

11. The device according to claim 10, wherein the first inner side of the substantially shell-shaped hinge part of the support is concave and is fittingly positioned around the hinge part of the base part, wherein
    the second inner side of the hinge part of the base part is convex, and
    the hinge part of the base part is substantially spherical or ball-shaped.

12. The device according to claim 11, wherein
    the first outer side of the substantially shell-shaped hinge part of the support is convex, and
    the third inner side of the hinge part of the supporting frame is concave and is fittingly positioned around the substantially shell-shaped hinge part of the support.

13. The device according to claim 12, wherein a first virtual center of the first inner side of the first spherical segment and a second virtual center of the first outer side of the first spherical segment substantially coincide.

14. The device according to claim 10, wherein
    the first inner side of the substantially shell-shaped hinge part of the support is convex, and the third inner side of the hinge part of the base part is concave, and is fittingly positioned around the first inner side of the substantially shell-shaped hinge part of the support.

15. The device according to claim 14, wherein
the first outer side of the substantially shell-shaped hinge part of the support is concave,
the third inner side of the hinge part of the supporting frame is,
and the first outer side of the substantially shell-shaped hinge part of the support is fittingly positioned around the third inner side of the supporting frame.

16. The device according to claim 15, wherein a third virtual center of the first inner side of the first spherical segment and a fourth virtual center of the first outer side of the first spherical segment substantially coincide.

17. A device for adjusting a shell-shaped housing part for a mirror device of a motor vehicle comprising:
a base part, for attachment to a body of the motor vehicle;
a supporting frame arranged on the base part;
a first hinge construction including a first actuator with which the supporting frame is pivotable relative to the base part about a first hinge axis between a folded-in position and a folded-out position;
a support arranged on the supporting frame and coupled therewith, wherein
the shell-shaped housing part is provided on or forms the support, and
the support is adapted for supporting a mirror surface; and
a second hinge construction including a second actuator with which the support is pivotable relative to the supporting frame about a second hinge axis, wherein
an output gearwheel of a first drive train driven by the first actuator engages a first main toothing, wherein:
the first main toothing extends at least in part around the first hinge axis, and
the first main toothing is positioned substantially non-rotatably relative to the first hinge axis, and
the first main toothing is coupled with the base part such that the first main toothing is substantially locked against rotation about the first hinge axis using a coupling configured to unlock when a predetermined torque is applied to the supporting frame, and
the coupling is a slip coupling or other coupling;
the first hinge axis extends in a substantially upward direction,
the second hinge axis extends substantially transverse to the substantially upward direction,
the first actuator is suitable for rotating the supporting frame, the support, and the shell-shaped housing part relative to the base part about the first hinge axis, and
the second actuator is suitable for rotating the support and the shell-shaped housing part relative to the supporting frame and the base part about the second hinge axis.

18. A device for adjusting a shell-shaped housing part for a mirror device of a motor vehicle comprising:
a base part, for attachment to a body of the motor vehicle;
a supporting frame arranged on the base part;
a first hinge construction including a first actuator with which the supporting frame is pivotable relative to the base part about a first hinge axis between a folded-in position and a folded-out position;
a support arranged on the supporting frame and coupled therewith, wherein
the shell-shaped housing part is provided on or forms the support, and
the support is adapted for supporting a mirror surface; and
a second hinge construction including a second actuator with which the support is pivotable relative to the supporting frame about a second hinge axis, wherein
an output gearwheel of a second drive train driven by the second actuator engages a second main toothing, wherein the second main toothing extends at least in part around the second hinge axis, the second main toothing is positioned substantially non-rotatably relative to the second hinge axis,
the first hinge axis extends in a substantially upward direction,
the second hinge axis extends substantially transverse to the substantially upward direction,
the first actuator is suitable for rotating the supporting frame, the support, and the shell-shaped housing part relative to the base part about the first hinge axis, and
the second actuator is suitable for rotating the support and the shell-shaped housing part relative to the supporting frame and the base part about the second hinge axis.

\* \* \* \* \*